United States Patent [19]
Bohner et al.

[11] Patent Number: 5,893,427
[45] Date of Patent: Apr. 13, 1999

[54] HYDRAULIC POWER STEERING FOR MOTOR VEHICLES

[75] Inventors: Hubert Bohner, Böblingen; Martin Moser, Fellbach, both of Germany

[73] Assignee: Mercedes-Benz AG, Stuffgart, Germany

[21] Appl. No.: 08/791,484

[22] Filed: Jan. 27, 1997

[30] Foreign Application Priority Data

Jan. 30, 1996 [DE] Germany .................. 196 03 270

[51] Int. Cl.⁶ ............................................. B60D 5/00
[52] U.S. Cl. ................................. 180/403; 180/402
[58] Field of Search ................... 180/402, 403, 180/405, 406, 407

[56] References Cited

U.S. PATENT DOCUMENTS

| | | | |
|---|---|---|---|
| 2,640,322 | 6/1953 | Puerner | 180/403 |
| 3,580,352 | 5/1971 | Hestad et al. | 180/79.2 |
| 4,144,947 | 3/1979 | Withers et al. | 180/132 |
| 4,874,054 | 10/1989 | Watanabe . | |
| 4,917,139 | 4/1990 | Narumi et al. | 137/110 |
| 5,230,396 | 7/1993 | Yasui | 180/79.1 |
| 5,249,639 | 10/1993 | Marr et al. | 180/133 |
| 5,347,458 | 9/1994 | Serizawa et al. | 180/424.05 |
| 5,372,214 | 12/1994 | Haga et al. | 180/132 |

FOREIGN PATENT DOCUMENTS

| | | |
|---|---|---|
| 0 655 157 | 8/1995 | European Pat. Off. . |
| 0 665 157 | 8/1995 | European Pat. Off. . |
| 35 36 563 | 4/1986 | Germany . |
| 39 18 987 | 12/1989 | Germany . |
| 43 42 451 | 7/1994 | Germany . |
| 43 07 890 | 9/1994 | Germany . |
| 44 38 929 | 10/1995 | Germany . |
| 2 290 511 | 1/1996 | United Kingdom . |

*Primary Examiner*—Lanna Mai
*Assistant Examiner*—Jim McClellan
*Attorney, Agent, or Firm*—Klaus J. Bach

[57] ABSTRACT

A control motor is provided which steers the vehicle wheels via a steering gear and a hydraulic servo motor is operatively connected to the steered vehicle wheels for supporting the control motor in following the control movements of a steering means operated by a vehicle operator, a servo valve arrangement is provided which controls hydraulic fluid admission to the hydraulic servo motor such that hydraulic fluid is admitted to the hydraulic servo motor only when the steering forces transmitted through the steering gear exceed a predetermined threshold value so that the vehicle wheels are steered by the control motor only when the forces transmitted through the steering gear are below the threshold value.

5 Claims, 4 Drawing Sheets

HYDRAULIC POWER STEERING FOR MOTOR VEHICLES

BACKGROUND OF THE INVENTION

The invention relates to a hydraulic power steering for motor vehicle having a mechanical steering mechanism connected to the steered vehicle wheels for steering the wheels with an element which has a normal position out of which it can be moved against the force of a spring depending on the forces effective between the steered vehicle wheels and the steering mechanism, a servo-valve arrangement controllable by the position of the element and a hydraulic servo-motor controllable by the servo valve and connected to the steered vehicle wheels or to the steering mechanism connected to the steered vehicle wheels for steering the vehicle wheels.

Such power steerings are generally known and are installed in motor vehicles in large numbers. The operating member is generally a driver operated steering wheel (or some other operating handle). The servo-motor is energized depending on the forces transmitted between the steering wheel and the steered vehicle wheels so as to reduce the manual force to be applied to the steering wheel.

In present power steerings, the servo-valve arrangement usually has a so-called open center that is pressurized hydraulic fluid passes through the servo-valve arrangement also when the steering is in a straight driving position for which only small forces are necessary at the steering wheel. Nevertheless, power is consumed in this position for maintaining the pressurized hydraulic fluid flow.

Power steerings with so-called closed centers with no pressurized fluid flow in a straight driving position and with only small manual forces wherein no power is needed are also known. In this case, the servo-valve arrangement opens only when a force is applied to the steering wheel whereby communication is established between the pressurized fluid source or, respectively, a pressurized fluid storage space and the serv-omotor. Such systems, however, are not in practical use. The reason is probably that the opening behavior of servo valve arrangements with closed centers is somewhat problematic as the servo forces are initiated suddenly that is not smoothly so that the transition is quite noticeable.

All power steering systems presently in use have a mechanical connection between the steering wheel and the steered vehicle wheels which provides for a mechanical coupling between the steering wheel and the steered vehicle wheels to insure greatest safety.

It is well known, however, to operate with the steering wheel or operating member only a setting means which cooperates, via a control system, with a control device whose control movements are adjusted by a position setting-to actual position comparison and are essentially proportional to the adjustment movements of the operating member. Such control arrangements utilizing electronic control systems are used, for example, in airplanes for the adjustment of the wing flaps, the elevators and the rudders. These control systems which are also called "fly-by-wire" systems are in the meantime so safe that they are used not only in military aircraft but also in commercial passenger airplanes.

It is the object of the present invention to utilize such a concept also with vehicle steering systems together with proven components of conventional power steering systems in such a way that the power requirements for the power steering are substantially reduced.

SUMMARY OF THE INVENTION

In a hydraulic power steering for a motor vehicle wherein a control motor is provided which steers the vehicle wheels via a steering gear and a hydraulic servo motor is operatively connected to the steered vehicle wheels for supporting the control motor in following the control movements of a steering means operated by a vehicle operator, a servo valve arrangement is provided which controls hydraulic fluid admission to the hydraulic servo motor such that hydraulic fluid is admitted to the hydraulic servo motor only when the steering forces transmitted through the steering gear exceed a predetermined threshold value so that the vehicle wheels are steered only by the control motor when the forces transmitted through the steering gear are below the threshold value.

The invention is based on the concept of eliminating the mechanical interconnection between the steering operating member, that is the steering wheel and the steered vehicle wheels. The steering operating member, that is the steering wheel actuates then, by way of a control circuit, a remote control motor which operates the steering mechanism for the steered vehicle wheels, wherein the control motor may be supported by a hydraulic servo-motor. In this case, the control of the servo valve arrangement is such that the servo valve arrangement can be moved out of its normally closed position only if forces are transmitted between the control motor and the steered vehicle wheels which exceed a predetermined threshold value. If only smaller forces are transmitted between the control motor and the steered vehicle wheels, the servo valve remains closed and the control motor alone is used to provide the steering forces for steering the steered vehicle wheels. As a result, a servo valve arrangement with closed center can be utilized without problems since a possibly sudden initiation of the servo-motor is not critical when the forces to be transmitted between the control motor and the steered vehicle wheels are greater than the threshold value. Variation of the control motor load which is already under a certain load when the servo-motor is actuated can be easily compensated.

Consequently, the control motor is coupled with the front wheels in the same manner as the steering wheel is coupled in the prior art power steering systems with the steered wheels so that there are similar conditions like they are present in the prior art power steering systems.

By the omission of the steering column normally present between the steering wheel and the steering gear, a substantial amount of space is saved and, at the same time, a number of friction generating bearings are omitted.

In a preferred embodiment, the threshold value may be so selected that the hydraulic servo-motor is operative essentially only at low vehicle speeds for example during parking maneuvers that is when relatively large steering forces must be generated. Smaller, that is, "normal" steering movements are executed alone by the control motor.

In a preferred design arrangement, the control motor is connected to the steered vehicles wheels by way of a worm gear and a spur gear in engagement therewith and the worm gear which is operated by the control motor is so supported that it is movable in axial direction against the force of a spring and, by its axial movement, controls the servo valve arrangement.

Preferred embodiments of the invention are described below on the basis of the accompanying drawings.

DESCRIPTION OF THE INVENTION

Figure 1:
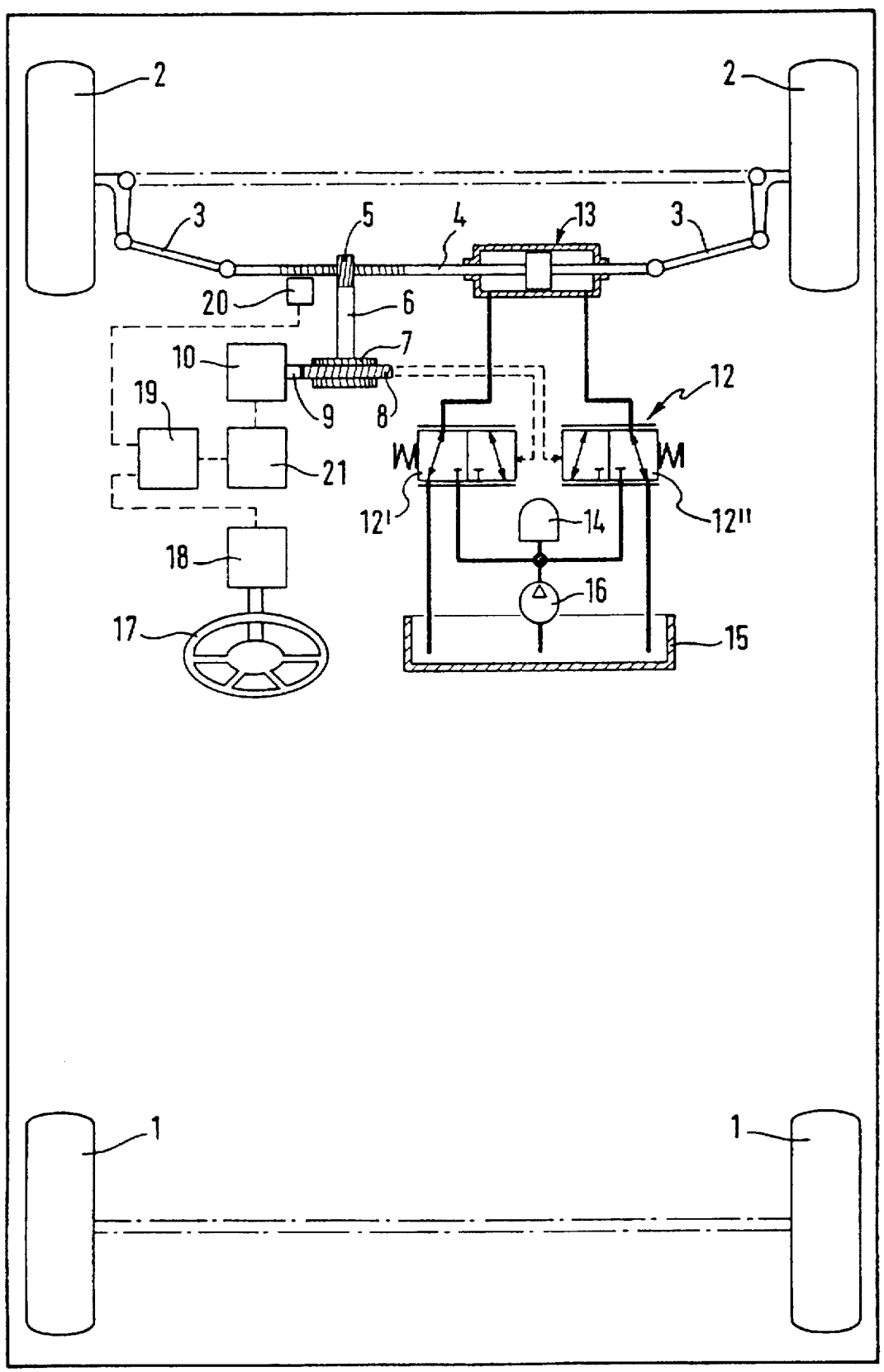
FIG. 1 is a schematic representation of the power steering arrangement according to the invention.

As shown in FIG. 1, a vehicle which is not shown in detail has a rear axle with wheels 1 which are not steerable and a front axle with steerable wheels 2. The front wheels 2 are coupled, in a well known manner, by way of tie rods 3, with a toothed rack 4 of a rack and pinion steering such that the front wheels 2 are tilted with longitudinal displacement of the rack in one or the opposite direction.

The toothed rack 4 is in engagement with a pinion 5 which is rotationally firmly connected by a pinion shaft 6 with a spur gear 7. The spur gear 7 is in operative engagement with a worm gear 8 which is mounted for rotation with an output shaft 9 of an electric control motor 10 but which is supported so as to be axially movable against the force of a spring arrangement which is not shown in FIG. 1 but which biases the worm gear into a center position. Depending on the direction and the size of the torque transmitted between the worm gear 8 and the spur gear 7, the worm gear is axially displaced more or less in one or the other axial direction.

The axial displacement of the worm gear 8 controls a valve unit 12, which in a manner as described below, controls the supply of fluid from a pressurized fluid accumulator 14 to a cylinder piston unit 13 serving as a servo motor and the discharge of hydraulic fluid from the cylinder piston unit 13 to a hydraulic fluid tank 15. The piston rod of the cylinder-piston unit is formed by a toothless, rod-like portion of the toothed rack 4.

The pressurized fluid accumulator 14 is charged when necessary by a hydraulic pump 16 whose suction side is in communication with the hydraulic fluid tank 15.

With the steering wheel 17, an electric or electronic value setting means 18 is operated whose output is connected to the input of an electric or electronic control unit 19. The control unit 19 has another input connected to a position sensor 20 which cooperates with the rack 4 and whose signals are indicative of the actual position of the rack and, consequently, of the steering angle of the front wheels 2. The control unit 19 has an output connected, by way of a driver circuit 21, to the electric control motor 10 for controlling the control motor 10.

OPERATION OF THE STEERING

The vehicle driver operates the steering wheel 17 as usual, whereby the value setting means 18 provides a setting value for the steering angle for the front wheels 2. The control unit 19 compares the setting value provided by the value setting means 18 with the actual value provided by the position sensor 20 and controls the electric motor 10 by way of the driver circuit 21 depending on the set value—actual value comparison in such a way that the actual value of the steering angle is corrected to the set value. During such steering operations, the worm gear 8 is displaced more or less in one or the opposite axial direction depending on the forces, that is the torque transmitted between the worm gear 8 and the spur gear 7. With small forces or torques, the axial displacement of the worm gear 8 is sufficiently small so that the valve unit 12 is not activated, that is, it remains in the position as shown wherein both sides of the cylinder piston unit are in communication with the hydraulic fluid tank 15 and the pressurized hydraulic fluid accumulator 14 is isolated. As a result, the steered vehicle wheels 2 are controlled solely by the electric control motor 10 when small forces or torques are transmitted between the worm gear 7 and the spur gear 8.

As soon as greater forces or torques are transmitted between the worm gear 7 and the spur gear 8, the worm gear is sufficiently displaced axially in one or the opposite direction so that either the valve 12' or the valve 12 of the valve unit, 12' are moved from the normal position shown in FIG. 1 to another position. As a result, one of the opposite sides of the cylinder piston unit 13 is placed in communication with the pressure reservoir 14 or the discharge side of the pump 16. The communication path preferably includes a flow limiting throttling structure. The other side of the cylinder piston unit 13 remains in communication with the tank 15. As a result, the cylinder-piston unit generates a hydraulic control force which enhances the steering force generated by the electric control motor 10.

With the arrangement according to the invention, the electric control motor may have a relatively low power output and therefore can be quite compact. As soon as a greater force is required for steering the front wheels 2, the electric control motor 10 is supported hydraulically by the cylinder piston unit 13 which represents a servo motor. The electric control motor 10 may be particularly small as there is a relatively large transmission ratio between the worm gear 8 and the spur gear 7 so that the worm gear rotates quickly relative to the spur gear when the angular position of the front wheels 2 is changed.

Figure 2:
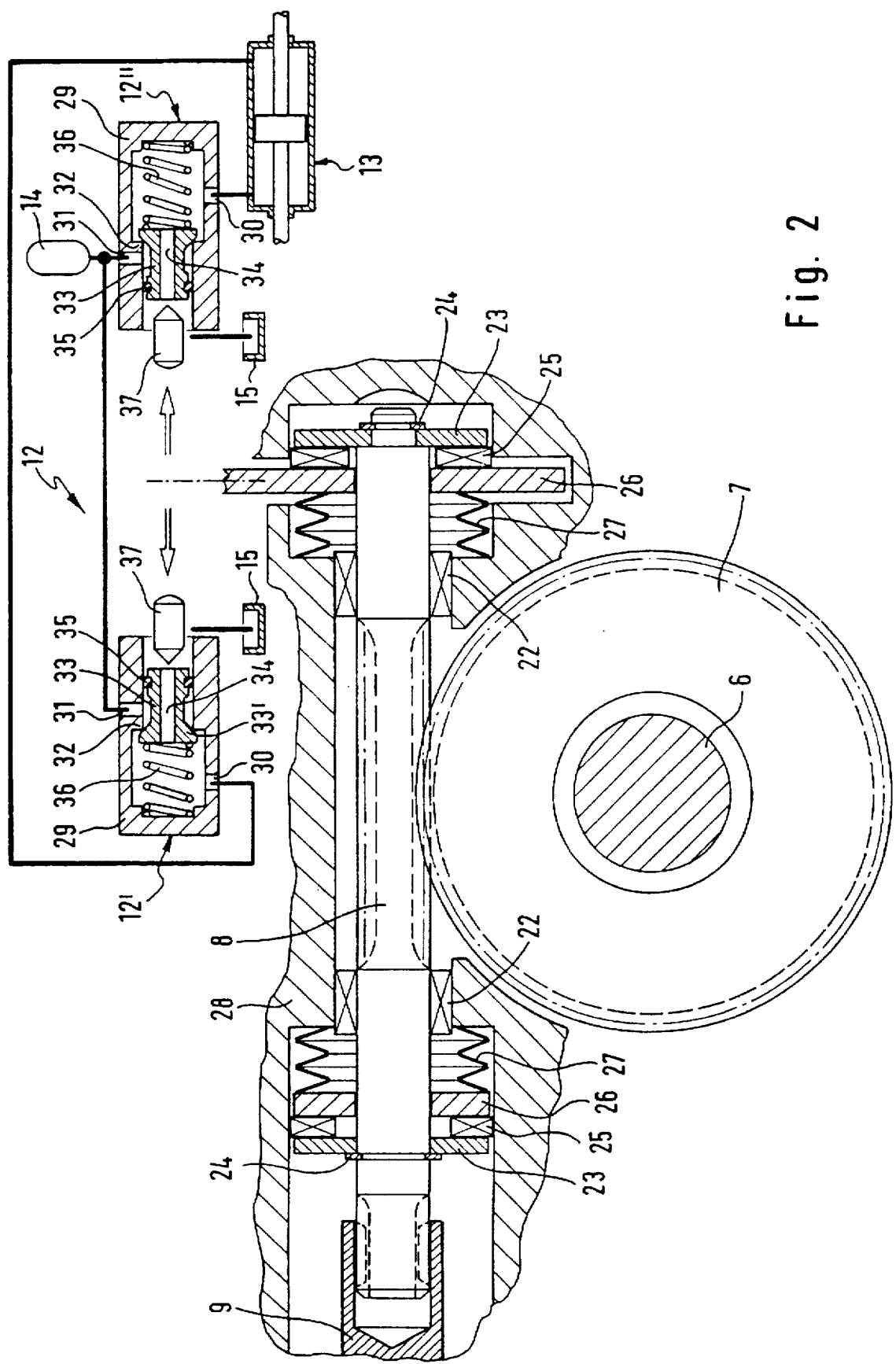
FIG. 2 shows a first embodiment of a drive coupling between an electric control motor and a steering gear and also the control arrangement for a servo valve.

As shown in FIG. 2, the worm gear 8 is supported at opposite ends of the worm gear structure by radial bearings 22 so as to be axially movable. For axial support, annular discs 23 are mounted on the worm gear shaft which, at their sides remote from the worm gear, are each engaged by a mounting clip 24. At their sides facing each other the annular discs 24 are engaged by axial bearings 25 disposed between the discs 24 and bearing discs 26 which are biased against the bearings 25 by Belleville springs 27. The Belleville springs 27 are supported on stationary housing parts 28.

Upon axial movement of the worm gear 8, the bearing discs 26 are moved axially together with the worm gear 8. Accordingly, one of the bearing discs, as shown in the example of FIG. 2 the right side bearing disc 26, can be provided with an extension utilized as an operating element for controlling the valve unit 12.

As shown in FIG. 2, the valve unit 12 includes two valves 12' and 12" which are seat-controlled valves, each comprising a valve housing 29 with stepped axial bores. Each valve housing 29 has two radial ports 30, 31 arranged in the housing 29 in axially spaced relationship and the housing 29 has a shoulder 32 disposed between the radial ports 30, 31 such that the inner closed end of the housing 29 has an enlarged diameter. The shoulder 32 forms a seat for a valve body 33 which includes an axial bore 34 with a cone-like seating structure 33' cooperating with the valve seat formed by the shoulder 32. At its end remote from the seating structure 33', the valve body 33 is provided with a circumferential seal ring 35 so as to be slideable within the axial bore of valve housing 29. In axial direction between the seal ring 35 and the cone-like seating structure 33', the valve body 33 has a reduced outer diameter such that an annular space is formed within the valve housing 29 in the area of the radial port 31. The valve body 33 is biased by a spring 36 so as to be seated on the shoulder 32. Co-axially with the axial bore 34, the valve further includes a pin-like closing member 37 which can be moved into engagement with the adjacent opening of the axial bore 34 to close the axial bore 34.

The closing members 37 are normally disengaged from the axial bore 34 that is, they are in an open position. Only with a certain play, that is, by a predetermined axial displacement of the bearing disc 26 which is coupled with the closing members one of the closing members 37 is engaged with the respective valve body 33 so that its axial bore 34 is closed and the valve body 33 is unseated from the shoulder 32.

In the normal position as shown in FIG. 2, the valve bodies 33 are seated and the closing members 37 are unseated so that both operating spaces of the cylinder and piston unit are in communication with the hydraulic fluid tank 15 by way of the radial ports 30 and the axial bore 34 of the valve body 33. However, if with a predetermined axial movement of the worm gear 8, the closing member 37 of one of the valves 12' or 12" is engaged with the valve body 33 so that its axial bore 34 is closed and the valve body is unseated from the shoulder 32, fluid under pressure is supplied from the hydraulic accumulator 14 through the radial port 31 to the respective side of the cylinder and piston unit 13 to aid in the steering process.

Figure 3:
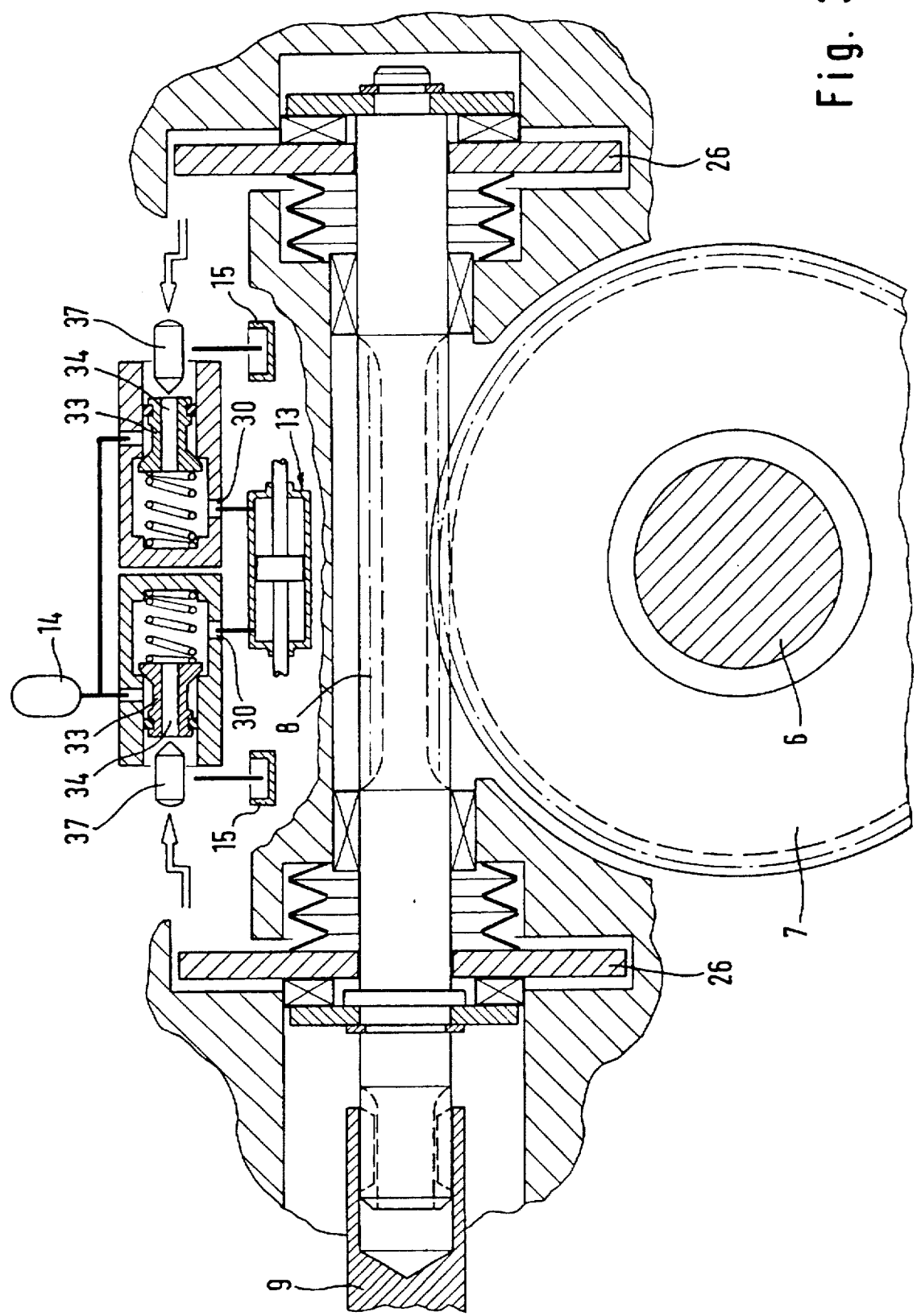
FIG. 3 shows a modification of the embodiment shown in FIG. 2.

The embodiment as shown in FIG. 3 is different from that of FIG. 2 only in that both bearing discs 26 are utilized for operating the valves 12' and 12" of the valve unit 12 and the valve unit 12 is disposed between the bearing discs 26.

Figure 4:
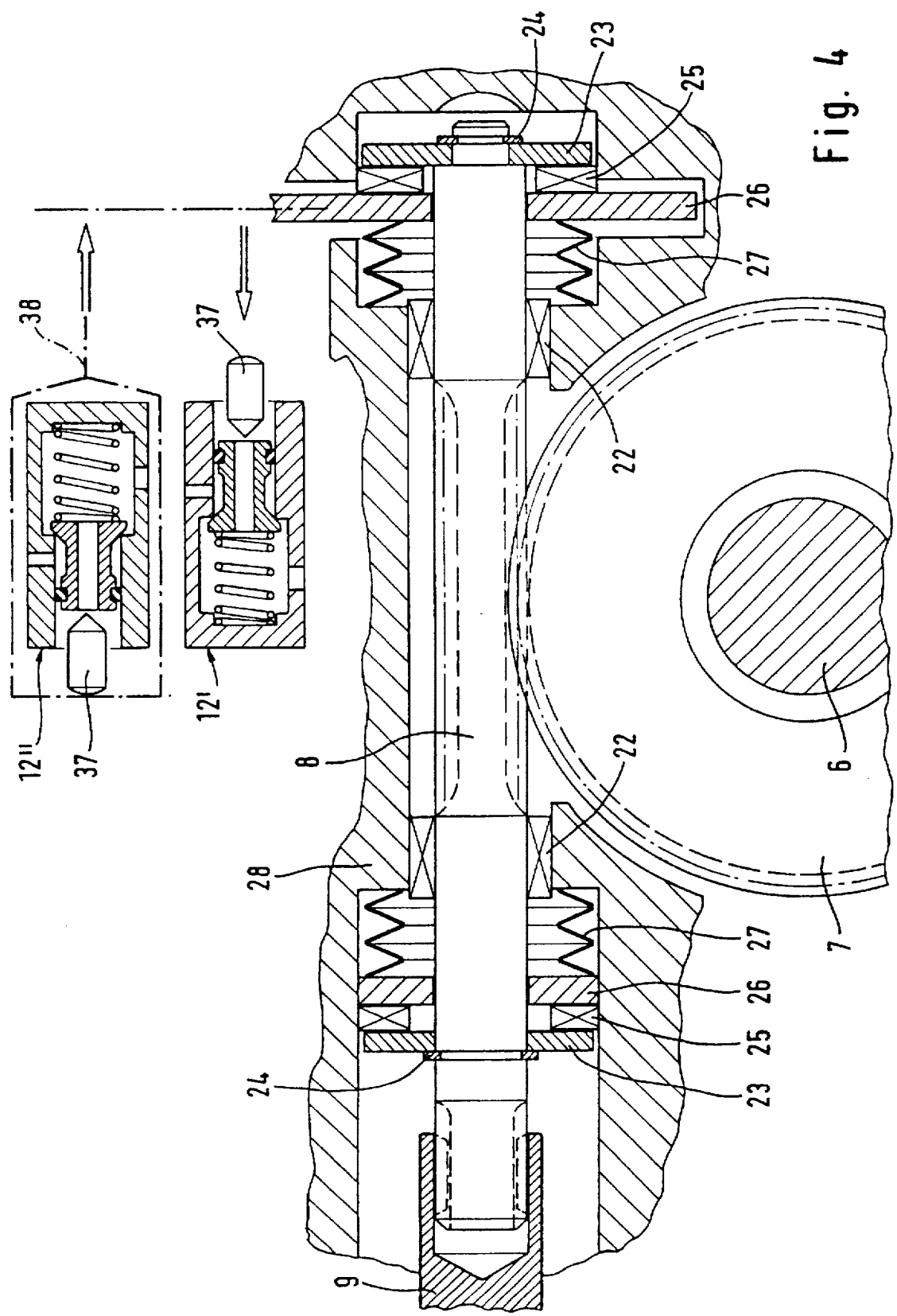
FIG. 4 shows another modification.

However, as shown in FIG. 4, only one of the two bearing discs may be utilized to operate both valves 12' and 12" even if both valves 12' and 12" are disposed at the same side of the respective bearing disc 26. For this purpose, in FIG. 4, the closing member 37 of the valve 12" is operatively connected with the bearing disc 26 by a coupling element 38.

For the possibility of malfunctioning of the valve unit 12 (see particularly FIG. 1), a communication line with a valve may be provided between the ports of the cylinder and piston unit 13. The valve would normally be closed but would automatically be opened upon malfunctioning of the valve unit 12 so that the valve unit 12 is bypassed and the front wheels 2 can be steered alone by the electric control motor 10.

If appropriate, the communication line may not only provide for communication between the two chambers of the cylinder and piston unit 13 when the valve is opened but may also provide for communication with the hydraulic fluid tank 15. In this case, that is, if both chambers are in communication with the tank 15 when the valve is opened, there is no need for a communication line between the two chambers of the cylinder and piston unit 13.

What is claimed is:

1. A hydraulic power steering for a motor vehicle having steered vehicle wheels, said power steering comprising an electric control motor, a steering gear structure operatively disposed between said electric control motor and said steered vehicle wheels for transmitting control movements thereto, a hydraulic servo-motor operatively connected to said steered vehicle wheels for supporting the control movements of said electric control motor, a steering means to be operated by a vehicle operator and being operatively connected to a setting means for controlling said electric control motor via a control circuit, and a servo-valve arrangement associated with said hydraulic servo-motor, said steering gear structure including an operating element for actuating said servo-valve arrangement when steering forces are transmitted through said steering gear structure which exceed a predetermined threshold value so as to actuate said hydraulic servo-motor only when steering forces exceeding said threshold value are required for operating said steered vehicle wheels,aid electric control motor being only large enough to be capable of operating said steered vehicle wheels via said steering gear structure when said steering forces are below said threshold value.

2. A hydraulic power steering according to claim 1, wherein said operating element and said servo valve arrangement are coupled with each other with a predetermined play.

3. A hydraulic power steering according to claim 1, wherein said operating element is biased by spring forces into a normal center position and is capable of leaving such normal center position only if the forces transmitted by said operating element exceed said spring forces.

4. A hydraulic power steering according to claim 1, wherein said control motor is connected to said steered vehicle wheels by way of a worm gear arrangement, said worm gear arrangement being axially movably supported and springs are provided for retaining said worm gear arrangement in an axial center position, said worm gear arrangement including said operating element for actuating said servo valve arrangement.

5. A hydraulic power steering according to claim 1, wherein said servo valve arrangement includes valves with valve seats for controlling hydraulic fluid flow through said valves.

* * * * *